UNITED STATES PATENT OFFICE.

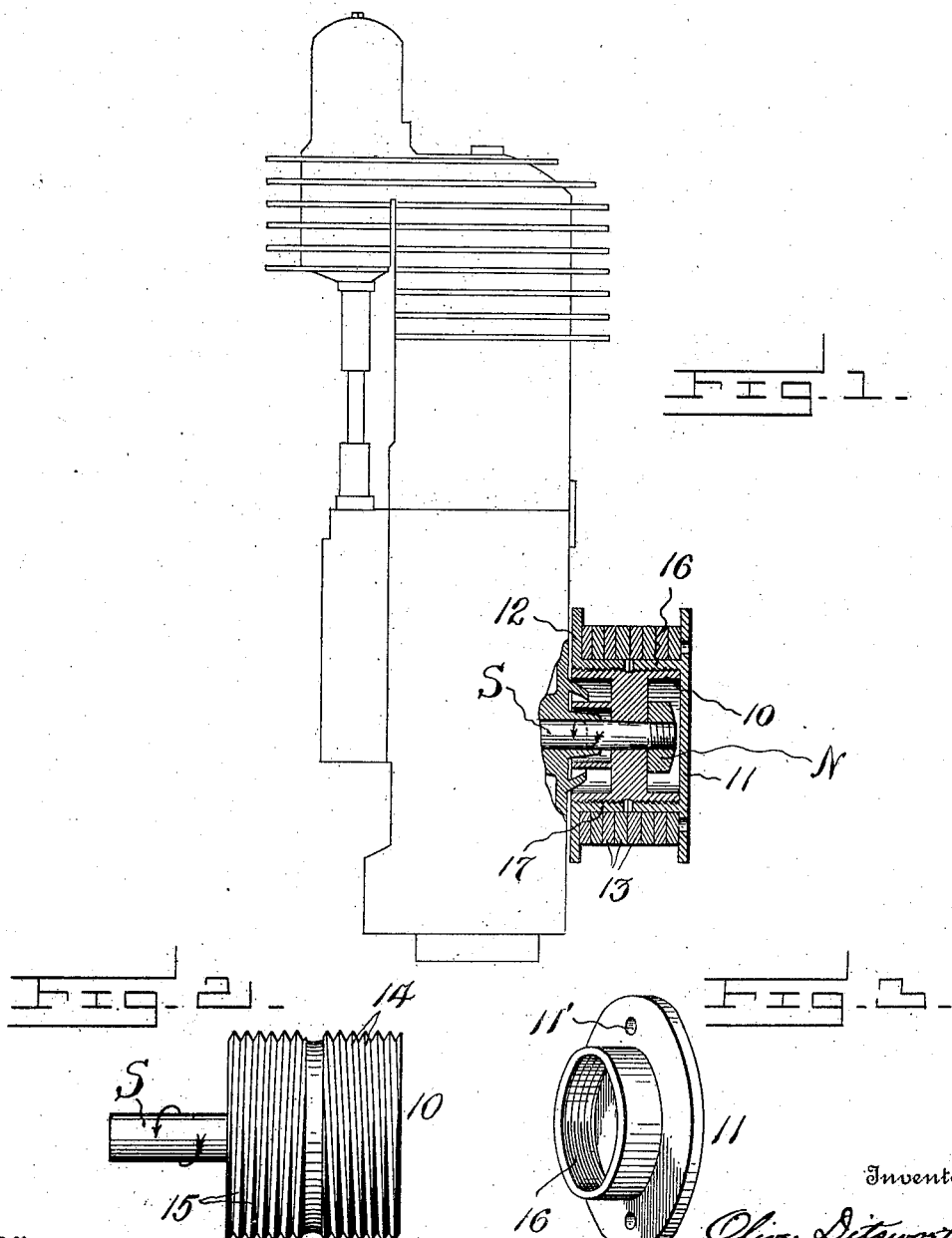

OLIVER DITSWORTH, OF MOUNT CARROLL, ILLINOIS.

PULLEY.

1,021,764.  Specification of Letters Patent.  Patented Apr. 2, 1912.

Application filed July 29, 1911. Serial No. 641,251.

*To all whom it may concern:*

Be it known that I, OLIVER DITSWORTH, a citizen of the United States, and a resident of Mount Carroll, in the county of Carroll, State of Illinois, have invented a new and useful Improvement in Pulleys, of which the following is a specification.

This invention relates to pulleys designed for the transmission of power and especially adapted for use in connection with high speed motor shafts from which power is to be transmitted to machines through flexible leather or fabric belts. The pulley is well adapted for use upon a threshing machine cylinder which is to be driven by a belt from a traction engine, upon dynamo shafts, and the like. It is to be understood, however, that I am not to be limited to any specific application of the invention, reserving the right to employ the principle of the invention in any capacity in which it may be found applicable.

The object of the invention is to construct a pulley of the character indicated so that the lagging will be securely held in place without the use of nails, screws, rivets, or any other metallic fasteners which prove in practice so destructive to the belt, due to the fact that the lagging will soon wear down, leaving the fasteners exposed and in deteriorating contact with the working surface of the belt.

Another object is to construct a pulley whose rim is covered with a non-metallic material of homogeneous nature, which possesses uniformly good gripping qualities and which may easily be renewed if necessary.

The foregoing and other objects are attained by the construction hereinafter fully described and claimed, and illustrated in the accompanying drawings, in which—

Figure 1 is a vertical sectional view of the pulley shown as applied to a conventional form of motorcycle motor; Fig. 2 is an elevation of the pulley hub, and Fig. 3 is a detail of one of the side plates on a smaller scale than Fig. 2.

Throughout the following description and on the several figures of the drawings similar parts are referred to by like reference characters.

As herein illustrated the pulley comprises a hub 10, a pair of side plates 11 and 12, and a series of washers 13 constituting the lagging, said washers being adapted to be gripped by the substantially parallel flanges of said plates. The hub 10 is centrally bored so as to be fitted to the shaft S in any suitable manner and there secured in any suitable manner as by a nut N. The periphery of the hub is formed with right and left hand threads 14 and 15 with which coöperate the correspondingly threaded cylindrical portions 16 and 17 of the plates 11 and 12, respectively, whereby the plates are movable toward and from each other, either independently or simultaneously. In assembling the pulley the lagging and side plates are capable of free rotation with relation to the hub. When the power shaft is rotated in the direction indicated by the arrow the effect of the right and left threads is to cause the plates 11 and 12 to approach each other simultaneously and thus grip the lagging securely between them. The greater the rotative force applied to the pulley hub, with a corresponding resistance to such rotation, the tighter will the lagging be gripped. Should the shaft shown be one to be driven by the pulley in the opposite direction, power applied to the pulley will have the same effect on the lagging as that hereinbefore described.

When it becomes necessary to renew or replace any or all of the layers or laminæ of the lagging the outer plate 11 may be unscrewed from the hub by application of a spanner to the holes 11', which will free the laminæ and leave the pulley in condition for the desired renewal, when the said outer plate may be returned to its normal position. This operation may be effected with or without removing the pulley from the shaft. It is to be noted that the said outer plate 11, but for the spanner holes, is smooth and constitutes an effective closure or guard for the end of the shaft and nut, an item of vast importance in all classes of high speed machinery.

The several parts of the pulley may be made of any material suitable for the purpose for which the pulley is intended, and the relative sizes or proportions of the same may be varied to a great extent without departing from the spirit of the invention claimed.

Having thus described a preferred embodiment of the invention, what I claim and desire to protect by Letters Patent of the United States is:

1. The herein described pulley comprising a hub provided with right and left threaded portions, a pair of side plates having threaded engagement with the aforesaid hub portions and movable toward and from each other, and a non-metallic rim freely rotatable with relation to said hub and adapted to be gripped between said side plates by virtue of such relative rotation between the hub and the rim, substantially as set forth.

2. The hereindescribed pulley comprising a cylindrical hub whose periphery is provided with right and left threaded portions, a pair of side plates having cylindrical portions with right and left threads coöperating with the aforesaid threaded hub portions, respectively, said plates also having outwardly extending flanges, and a series of non-metallic washers constituting the pulley lagging mounted loosely for rotation upon the hub but adapted to be gripped between said outwardly extending flanges when the side plates are caused to approach each other by virtue of such rotation.

3. The combination of a shaft, a pulley comprising a hub centrally bored and fitted to said shaft, non-metallic lagging, and a pair of plates removably secured to the hub and gripping the lagging therebetween and constituting the sole means for securing the lagging upon the hub, and a fastener securing the hub upon the shaft, one of said plates constituting a guard inclosing said shaft fastener, substantially as set forth.

In testimony whereof I have hereunto affixed my signature in the presence of two subscribing witnesses.

OLIVER DITSWORTH.

Witnesses:
AARON K. SWEITZER,
EDWARD SWEITZER.